(12) United States Patent
Yasuda et al.

(10) Patent No.: US 12,239,106 B2
(45) Date of Patent: Mar. 4, 2025

(54) TROUGH STRUCTURE FOR FEEDING AND AUXILIARY TOOL FOR FEEDING

(71) Applicant: HYTEM CO., LTD., Kakamigahara (JP)

(72) Inventors: Katsuhiko Yasuda, Gifu (JP); Yoshihito Osada, Gifu (JP)

(73) Assignee: HYTEM CO., LTD., Kakamigahara (JP)

( * ) Notice: Subject to any disclaimer, the term of this patent is extended or adjusted under 35 U.S.C. 154(b) by 0 days.

(21) Appl. No.: 17/910,095

(22) PCT Filed: Jun. 22, 2021

(86) PCT No.: PCT/JP2021/023492
§ 371 (c)(1),
(2) Date: Sep. 8, 2022

(87) PCT Pub. No.: WO2022/269728
PCT Pub. Date: Dec. 29, 2022

(65) Prior Publication Data
US 2024/0196868 A1      Jun. 20, 2024

(51) Int. Cl.
*A01K 39/012*      (2006.01)
(52) U.S. Cl.
CPC .................. *A01K 39/012* (2013.01)
(58) Field of Classification Search
CPC .... A01K 39/01; A01K 39/014; A01K 39/012; B65G 19/22; B65G 45/14; B65G 45/16
USPC ............... 119/51.01, 51.12, 52.1, 57.2, 57.7; 198/498
See application file for complete search history.

(56) References Cited

U.S. PATENT DOCUMENTS

| | | | | |
|---|---|---|---|---|
| 1,322,607 | A | * | 11/1919 | Ozouf ...................... A22B 5/08 |
| | | | | 452/76 |
| 1,449,208 | A | * | 3/1923 | Wood ...................... B21D 53/00 |
| | | | | 29/889 |
| 2,154,707 | A | * | 4/1939 | De Los Sinden ...... B65G 19/16 |
| | | | | 198/561 |
| 2,294,080 | A | * | 8/1942 | Ehmann ................. B65G 19/22 |
| | | | | 198/733 |

(Continued)

FOREIGN PATENT DOCUMENTS

| | | | | |
|---|---|---|---|---|
| CN | 102669006 | A | * | 9/2012 ............. A01K 39/01 |
| CN | 108496849 | A | * | 9/2018 ............. A01K 39/01 |

(Continued)

*Primary Examiner* — Morgan T Jordan
*Assistant Examiner* — Hae Rie Jessica Byun
(74) *Attorney, Agent, or Firm* — Yoshida & Associates LLC; Kenichiro Yoshida

(57) ABSTRACT

In an auxiliary tool for feeding including a hook portion and wing portions, the hook portion includes a flat plate-like bottom surface portion, a flat plate-like top surface portion separated from the bottom surface portion in the up-down direction so as to be parallel with the bottom surface portion, a side surface portion coupling the bottom surface portion and the top surface portion on the same side, and claw portions extending downward from an end portion of the top surface portion on the opposite side to the side surface portion, and the wing portions extend in forms of V shapes from the side surface portion in the right-left direction and have elastic force to return to their original shapes when compressed such that angles of the V shapes are decreased.

3 Claims, 4 Drawing Sheets

(56) References Cited

U.S. PATENT DOCUMENTS

| | | | | |
|---|---|---|---|---|
| 2,320,834 A | * | 6/1943 | Schroeder | B65G 19/16 198/730 |
| 2,322,485 A | * | 6/1943 | Strube | B65G 19/16 198/716 |
| 2,667,263 A | * | 1/1954 | Bigler | B65G 19/22 198/733 |
| 2,674,365 A | * | 4/1954 | Russell | B65G 17/385 198/733 |
| 2,699,250 A | * | 1/1955 | Siciliano | B65G 19/22 198/727 |
| 3,262,548 A | * | 7/1966 | McAuley | A01K 39/01 474/236 |
| 3,324,990 A | * | 6/1967 | Karlovsky, Jr. | B65G 19/08 198/733 |
| 3,516,535 A | * | 6/1970 | Patz | B65G 45/14 198/498 |
| 3,957,153 A | * | 5/1976 | Krekeler | B65G 19/26 198/730 |
| 4,238,028 A | * | 12/1980 | Lake | B65G 19/24 198/733 |
| 4,441,605 A | * | 4/1984 | Ronco | B65G 19/22 198/731 |
| 4,585,117 A | * | 4/1986 | Hahn | B65G 19/24 198/867.01 |
| 4,756,404 A | * | 7/1988 | Maag | B65G 19/22 198/733 |
| 4,766,995 A | * | 8/1988 | Sterwerf, Jr. | B65G 19/08 198/852 |
| 5,096,048 A | * | 3/1992 | Lachner | B65G 19/28 198/733 |
| 5,226,526 A | * | 7/1993 | O'Brien | B65G 19/16 198/716 |
| 5,249,664 A | * | 10/1993 | Steinkuhl | B65G 19/24 198/732 |
| 5,626,095 A | * | 5/1997 | Runion | B65G 19/14 119/57.2 |
| 8,061,505 B2 | * | 11/2011 | Honegger | B65G 23/30 198/731 |
| 8,141,696 B2 | * | 3/2012 | O'Neill | B65G 19/24 198/730 |
| 8,177,049 B2 | * | 5/2012 | O'Neill | B65G 19/24 198/733 |
| 8,950,571 B2 | * | 2/2015 | O'Neill | B65G 19/20 198/851 |
| 9,415,939 B2 | * | 8/2016 | Arnold | B65G 19/20 |
| 10,106,325 B2 | * | 10/2018 | Walker | B65G 23/22 |
| 11,858,745 B2 | * | 1/2024 | Hoover | B65G 19/22 |
| 2002/0070096 A1 | * | 6/2002 | Swinderman | B65G 45/16 198/498 |
| 2009/0250318 A1 | * | 10/2009 | O'Neill | B65G 19/24 198/731 |
| 2015/0266677 A1 | * | 9/2015 | Fenile | B65G 19/025 198/562 |

FOREIGN PATENT DOCUMENTS

| | | | | |
|---|---|---|---|---|
| DE | 3325594 A1 | * | 1/1985 | |
| GB | 2216483 A | * | 10/1989 | A01K 39/01 |
| JP | 1974-003430 Y1 | | 1/1974 | |
| JP | 2005229951 A | * | 9/2005 | |
| JP | 2005-304402 A | | 11/2005 | |
| JP | 2013-179922 A | | 9/2013 | |
| KR | 960001737 Y1 | * | 2/1996 | |
| TW | M460526 U | * | 9/2013 | |

\* cited by examiner

TROUGH STRUCTURE FOR FEEDING AND AUXILIARY TOOL FOR FEEDING

BACKGROUND OF THE INVENTION

Field of the Invention

The present invention relates to a trough structure for feeding when feed is conveyed using a chain feed device in a trough arranged along a cage row in a poultry facility, and an auxiliary tool for feeding that is used for the structure.

Description of the Related Art

In a facility for raising a large number of chickens in a large number of cages, a plurality of stages of cage rows in which a plurality of cages are arranged side by side in a horizontal direction are stacked. A long trough is arranged in the horizontal direction along each cage row, and chicken feed is supplied into the trough. In general, the feed introduced from the outside in a certain portion of the long trough is conveyed in the trough by a feed device. As such a feed device, there is a chain feed device (chain feeder) including a chain arranged on a bottom portion of the trough and a drive device moving the chain along the trough. With movement of the chain, the feed is conveyed in the trough while being stirred to enable the chickens that are raised in the cages to take the feed.

The feed that has not made contact with the chain can however retain in the trough when feeding is performed using the chain feed device. If the chickens take the feed the freshness of which has been lowered due to retention, there is a risk that the health of the chickens is adversely affected. When the retaining feed becomes wet with saliva of the chickens and firmly adheres to the trough, the trough can be corroded in corresponding portions.

For this reason, a technique capable of preventing feed from retaining and firmly adhering to a trough when the feed is conveyed in the trough using a chain feed device has been required.

SUMMARY OF THE INVENTION

An object of the present invention is to provide a trough structure for feeding that is capable of preventing feed from retaining in a trough and firmly adhering to the trough when the feed is conveyed in the trough using a chain feed device, and an auxiliary tool for feeding that is used for the structure.

In order to achieve the above-described object, provided is a trough structure for feeding according to an aspect of the present invention in which "a chain of a chain feed device is arranged in a trough provided along a cage row in which a plurality of cages for raising chickens are arranged side by side in a horizontal direction, and an auxiliary tool for feeding is mounted on a part of the chain, wherein the auxiliary tool for feeding includes:

a hook portion configured to be hooked on a coupling portion of rings configuring the chain; and a wing portion having a V shape or a U shape and extending from the hook portion in at least one direction of a right-left direction as a direction orthogonal to a direction in which the rings are continuous, and an end portion of the wing portion is brought into pressure contact with the trough with elastic force to return to an original shape in a state where the wing portion is compressed such that an angle of the V shape or an aperture of the U shape is decreased."

With this configuration, the auxiliary tool for feeding is mounted on the chain arranged in the trough of a type into which feed is supplied with the chain feed device. When the chain feed device is used, the feed supplied into the trough is conveyed by moving the chain in the lengthwise direction of the trough, so that the chickens raised in the cages configuring the cage row can be fed.

The auxiliary tool for feeding includes the hook portion that is hooked on the coupling portion of the rings configuring the chain and the wing portion that extends in a form of the V shape or the U shape from the hook portion in at least one direction of the right-left direction. With this configuration, even when the feed is pushed away in the right-left direction with movement of the chain and becomes difficult to make contact with the subsequent chain to retain, the feed is pushed forward by the wing portion of the auxiliary tool for feeding, which moves with the chain, to be conveyed.

The end portion of the wing portion is brought into pressure contact with the trough with the elastic force to return to its original shape in the state where the wing portion is compressed such that the angle of the V shape or the aperture of the U shape is decreased. That is to say, the wing portion acts as a spring. With this action, even when the feed that has become wet with saliva of the chickens is about to firmly adhere to the trough, the end portion of the wing portion, which moves while being brought into pressure contact with the trough, acts like a "scraper" and the feed is scraped off, thereby effectively preventing firm adhesion of the feed to the trough.

In the above-described configuration, the trough structure for feeding in the aspect of the present invention can be configured such that "the hook portion includes:

a flat plate-like bottom surface portion, a flat plate-like top surface portion separated from the bottom surface portion in an up-down direction so as to be parallel with the bottom surface portion, a side surface portion coupling the bottom surface portion and the top surface portion on the same side, and a claw portion extending downward from an end portion of the top surface portion on an opposite side to the side surface portion."

With such a configuration of the hook portion, the hook portion can be hooked on the coupling portion of the chain with an easy operation without requiring any tools.

Next, an auxiliary tool for feeding according to another aspect of the present invention is "an auxiliary tool for feeding including a hook portion and at least one wing portion, wherein the hook portion includes a flat plate-like bottom surface portion, a flat plate-like top surface portion separated from the bottom surface portion in an up-down direction so as to be parallel with the bottom surface portion, a side surface portion coupling the bottom surface portion and the top surface portion on the same side, and a claw portion extending downward from an end portion of the top surface portion on an opposite side to the side surface portion, and the wing portion extends in a form of a V shape or a U shape from at least one of both end portions of the side surface portion in a right-left direction orthogonal to the up-down direction and has elastic force to return to an original shape when compressed such that an angle of the V shape or an aperture of the U shape is decreased."

This is the configuration of the auxiliary tool for feeding when the configuration of the hook portion is specified in the auxiliary tool for feeding that is used for the above-described trough structure for feeding.

In addition to the above-described configuration, the auxiliary tool for feeding in the aspect of the present invention can be configured such that "an end portion of the wing portion is formed to have a length in the up-down direction, which is larger than a length of a remaining portion."

In this configuration, the end portion of the wing portion is formed to be long in the up-down direction, so that when the end portion is brought into pressure contact with the trough like a scraper, the feed can be scraped off by a large area. The wing portion can be formed to be elongated except the end portion thereof, and action of the spring can thereby be adjusted by setting of the length thereof in the up-down direction.

As described above, the present invention can provide the trough structure for feeding that is capable of preventing feed from retaining in the trough and firmly adhering to the trough when the feed is conveyed in the trough using the chain feed device, and the auxiliary tool for feeding that is used for the structure.

DESCRIPTION OF THE EMBODIMENTS

Figure 1:
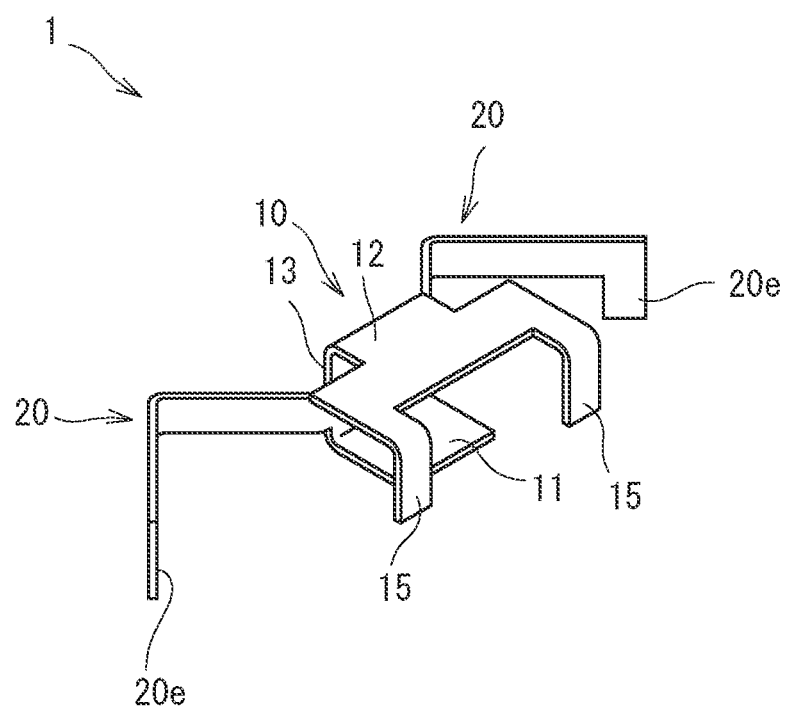
FIG. 1 is a perspective view of an auxiliary tool for feeding according to an embodiment.

Hereinafter, a trough structure for feeding as a specific embodiment of the present invention and an auxiliary tool for feeding 1 that is used for the structure will be described with reference to the drawings.

A trough 50 for feeding is provided along a cage row in which a plurality of cages for raising chickens are arranged side by side in a horizontal direction. Each trough 50 includes a bottom portion 51 having an elongated rectangular shape and side wall portions 52 extending upward from a pair of longer sides of the bottom portion 51. The pair of side wall portions 52 is inclined upward so as to be separated from each other.

A chain 30 of a chain feed device (chain feeder) is arranged on the bottom portion 51 of the trough 50. A general chain has a configuration in which one of adjacent rings among a large number of rings configuring the chain penetrates through a space surrounded by the other ring and spaces surrounded by the adjacent rings intersect with each other. By contrast, the chain 30 of the chain feed device has a configuration in which a ring 31 and a ring 31 are coupled by a coupling tool 32 such that spaces surrounded by the adjacent rings 31 can be on the same plane.

Figure 2:
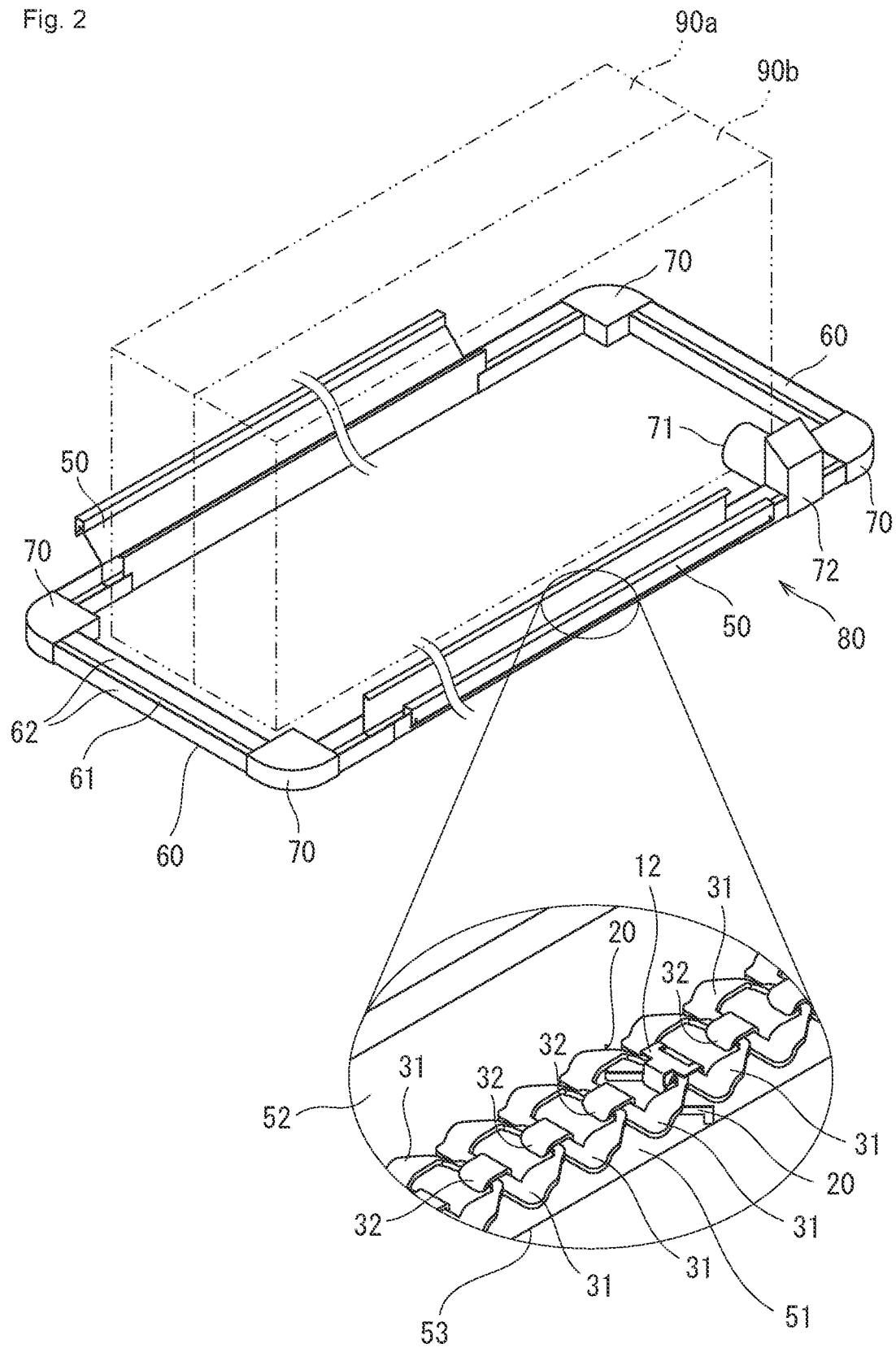
FIG. 2 is a perspective view illustrating a trough structure for feeding in which the auxiliary tool for feeding in FIG. 1 is mounted on a chain in a partially enlarged manner.
Figure 3A:
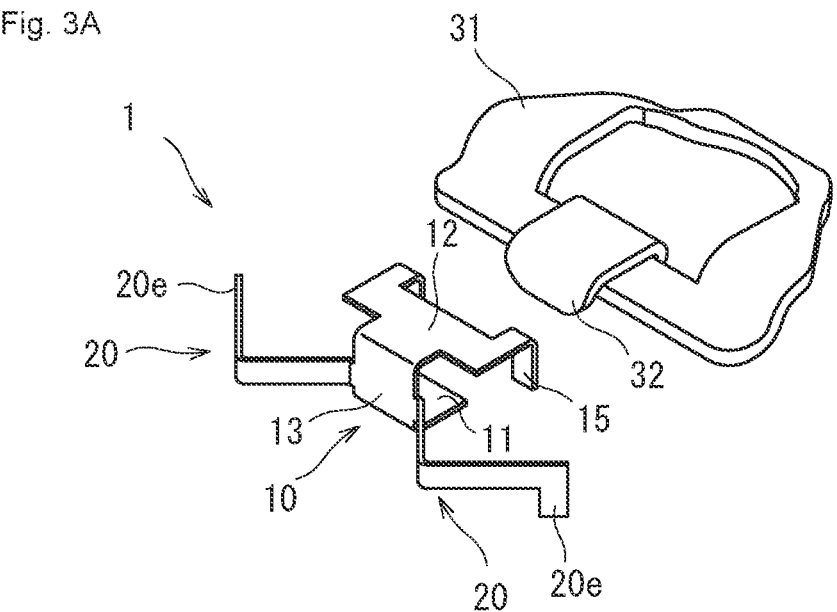
FIG. 3A and FIG. 3B are views for explaining mounting of the auxiliary tool for feeding on the chain.
Figure 3B:
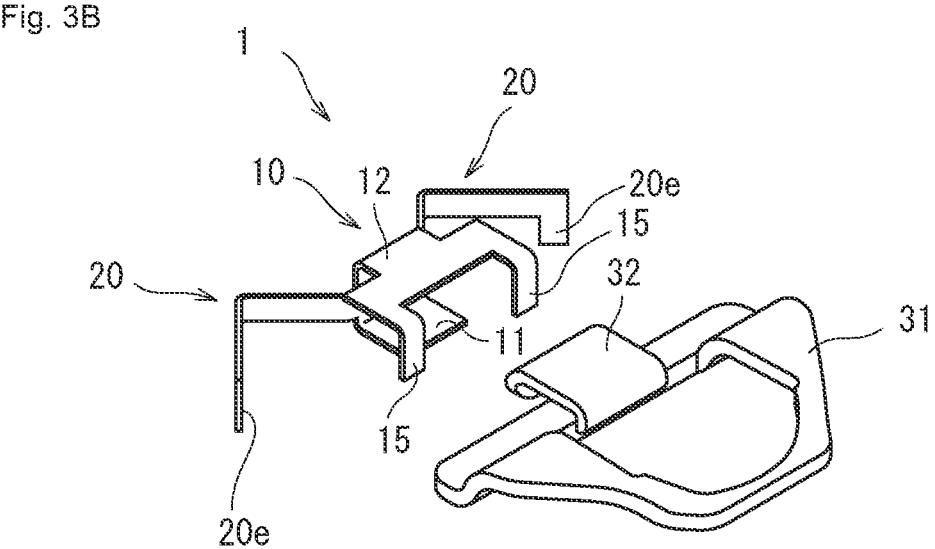
Figure 4:
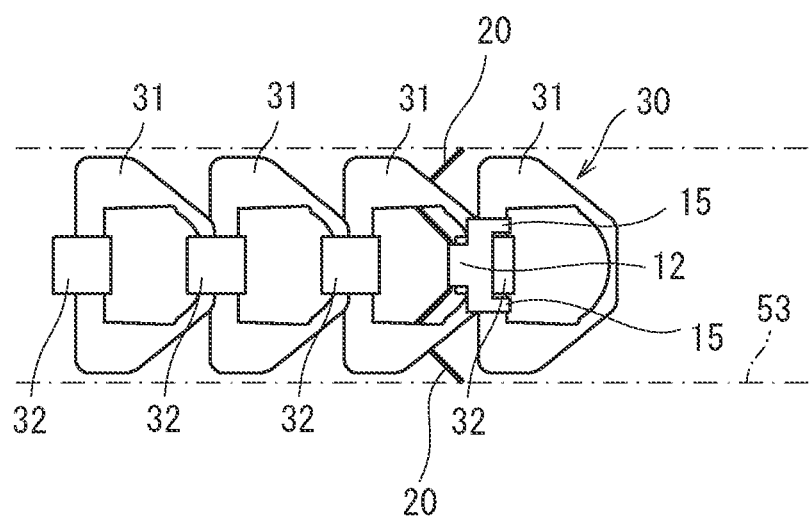
FIG. 4 is a view when the chain on which the auxiliary tool for feeding is mounted is seen from the right above.

As illustrated in FIG. 2, in order to enable the endless chain 30 to continuously move in a circulating manner on the bottom portion 51 of the trough 50 arranged along a certain cage row 90a and the bottom portion 51 of the trough 50 arranged along a cage row 90b having a back-to-back correspondence to the cage row 90a, end portions of the two troughs 50 on the same sides are coupled by coupling paths 60. Each coupling path 60 includes a bottom portion 61 having an elongated rectangular shape and side wall portions 62 extending upward from a pair of longer sides of the bottom portion 61.

Corner portions 70 converting the traveling direction of the chain 30 perpendicularly by rotation of pulleys are provided on both ends of the respective troughs 50. The chain 30 that has moved on the bottom portion 51 of the trough 50 along the cage row 90a moves on the coupling path 60 after conversion of the traveling direction thereof on the corner portion 70. Thereafter, the chain 30 moves on the bottom portion 51 of the trough 50 along the cage row 90b after conversion of the traveling direction thereof on the corner portion 70, and further moves on the coupling path 60 after conversion of the traveling direction thereof on the corner portion 70. Then, the chain 30 returns to the original trough 50 after conversion of the traveling direction thereof on the corner portion 70. In this manner, the chain 30 circulates along a cyclic chain traveling path 80 circulating around the cage rows.

A drive mechanism configured to drive the chain 30 is provided on the halfway of the chain traveling path 80. The drive mechanism includes a motor 71 and a transmission device 72 transmitting rotation of an output shaft of the motor 71 to the chain 30. The chain traveling path 80 and the drive mechanism are provided at each stage when a plurality of stages of cages are stacked.

Equal to or more than one auxiliary tool for feeding 1 is mounted on one endless chain 30. The auxiliary tool for feeding 1 in the embodiment includes a hook portion 10 and two wing portions 20. The hook portion 10 includes a flat plate-like bottom surface portion 11, a flat plate-like top surface portion 12 separated from the bottom surface portion 11 in the up-down direction so as to be parallel with the bottom surface portion 11, a side surface portion 13 coupling the bottom surface portion 11 and the top surface portion 12 on the same side, and claw portions 15 extending downward from an end portion of the top surface portion 12 on the opposite side to the side surface portion 13. Two claw portions 15 are provided, and a space that is slightly larger than the width of the coupling tool 32 of the chain 30 is provided between the two claw portions 15.

The wing portions 20 extend in forms of V shapes from both end portions of the side surface portion 13 of the hook portion 10 in the right-left direction orthogonal to the up-down direction. Only end portions 20e of the wing portions 20 are formed to have lengths, which are large in the up-down direction. In other words, the wing portions 20 are elongated except the end portions 20e.

The auxiliary tool for feeding 1 including the hook portion 10 and the wing portions 20 as described above can be manufactured by cutting and bending a flat plate made of metal. The wing portions 20 are formed by bending, into the V shapes, parts provided by cutting the flat plate made of metal into elongated shapes. Therefore, the wing portions 20 can be compressed such that angles of the V shapes are decreased and have elastic force to return to their original shapes from the compressed states. That is to say, the wing portions 20 act as springs. The magnitudes of the actions of the springs can be adjusted with the thicknesses of the wing portions 20 and the lengths of the wing portions 20 except the end portions 20e in the up-down direction.

When the auxiliary tool for feeding 1 is mounted on the chain 30, the auxiliary tool for feeding 1 is placed under the chain 30 arranged on the bottom portion 51 of the trough 50 and the hook portion 10 is hooked on the coupling portion of the chain 30. The two claw portions 15 of the hook portion 10 are separated from each other so as to be slightly larger than the width of the coupling tool 32, so that the hook portion 10 is hooked on the coupling portion of the chain 30 so as to interpose the coupling tool 32 from both sides with the claw portions 15. In this manner, the auxiliary tool for feeding 1 can be easily mounted on the chain 30 without requiring any fixing tools. The auxiliary tool for feeding 1 is mounted on the chain 30 such that the side surface portion 13 of the hook portion 10 is directed to the advancing direction of the chain 30 and tops of the V shapes of the wing portions 20 are directed to the advancing direction of the chain 30.

Extension lengths of the wing portions 20 are set in consideration of a distance between the pair of side wall portions 52 of each trough 50 such that the wing portions 20 are slightly compressed and each of the end portions 20e of the wing portions 20 is brought into pressure contact with the side wall portion 52 of the trough 50 in the state where the auxiliary tool for feeding 1 is mounted on the chain 30 as described above.

When the chickens raised in the cages are fed, feed is supplied into the troughs 50 through a hopper (not illustrated) in the vicinities of end portions of the troughs 50 and the chain 30 is moved with the drive mechanism. The movement of the chain 30 thereby causes the feed to be conveyed in the movement direction of the chain 30 while being stirred with the chain 30, so that the chickens in all the cages configuring the cage rows can be fed.

At this time, the feed pushed away in the right-left direction by the moving chain 30 is difficult to make contact with the subsequent chain 30 and tends to retain in the vicinities of boundaries 53 between the bottom portions 51 and the side wall portions 52 of the troughs 50. When the retaining feed becomes wet with saliva of the chickens, the feed can firmly adhere to the troughs 50.

To cope with this, in the embodiment, the auxiliary tool for feeding 1 is mounted on the halfway of the chain 30, and the wing portions 20 extend in the right-left direction from the hook portion 10 in the auxiliary tool for feeding 1. Therefore, the feed retaining at positions where the feed is difficult to make contact with the chain 30 is pushed by the wing portions 20 with the movement of the chain 30 to be conveyed.

The end portions 20e of the wing portion 20 are brought into pressure contact with each trough 50 with the elastic force to return to their original shapes in the state where the wing portions 20 are compressed such that the angles of the V shapes are decreased. The end portions 20e of the wing portions 20 are brought into pressure contact with the troughs 50 at the side wall portions 52 in the vicinities of the boundaries 53 with the bottom portions 51. With this configuration, even when the feed is about to firmly adhere to the vicinities of the boundaries 53, the end portions 20e of the wing portions 20, which move while being brought into pressure contact with the side wall portions 52, act like "scrapers" and the feed is scraped off, thereby effectively preventing firm adhesion of the feed to the troughs 50.

Only the end portions 20e of the wing portions 20 are formed to be long in the up-down direction, and the remaining portions thereof are formed to be elongated. Therefore, the actions of the springs are easy to be exerted by compression of the wing portions 20 such that the angles of the V shapes are decreased whereas the end portions 20e which are long in the up-down direction can scrape off the feed on the side wall portions 52 of the troughs 50 by wide areas.

The troughs 50 are extremely long in accordance with the lengths of the cage rows and are therefore formed by joining a plurality of parts. At such junctions of the troughs 50, coupling plates are made to abut and the distances between the pairs of side wall portions 52 are therefore decreased in ordinary cases. Furthermore, in the corner portions 70, members for reinforcing the strengths of curved portions are arranged and the widths thereof are therefore smaller than the distances between the pairs of side wall portions 52 in the troughs 50 in ordinary cases.

To cope with this, in the auxiliary tool for feeding 1, the wing portions 20 are compressed such that the angles of the V shapes are decreased and have the elastic force to return to their original shapes in the compressed states. Therefore, the auxiliary tool for feeding 1 can pass through portions where the distances between the pairs of side wall portions 52 are smaller than those of the other portions in the troughs 50 and portions where the widths are small in the corner portions 70 with no problem. In addition, after the auxiliary tool for feeding 1 passed through each narrow portion, the wing portions 20 extend in the right-left direction again and are brought into pressure contact with the pair of side wall portions 52 of the trough 50 or the pair of side wall portion 62 of the coupling path 60.

As described above, according to the embodiment, the risks that the feed retains in the troughs 50 and the feed firmly adheres to the troughs 50 can be effectively reduced only by mounting the auxiliary tool for feeding 1 having an extremely simple configuration on the chain 30.

The auxiliary tool for feeding 1 is driven by the drive mechanism included in advance in a poultry facility into which the chain feed device has been introduced and therefore has an advantage that a new driving source needs not to be provided in order to prevent the feed from retaining in the troughs 50 and firmly adhering to the troughs 50.

Hereinbefore, the present invention has been explained using the preferred embodiment. The present invention is not however limited to the above-mentioned embodiment, and various improvements and changes in design can be made in a range without departing from the scope of the present invention.

For example, although the auxiliary tool for feeding 1 that includes the wing portions 20 extending to both of the right and left sides from the hook portion 10 has been exemplified in the above-described embodiment, an auxiliary tool for feeding that includes only one wing portion 20 can be employed. Experience shows that the chickens raised in the cages tend to take the feed in portions closer to the side wall portions 52 on the sides farther from the cages and adherence of the feed also tends to occur in the vicinities of the boundaries 53 between the side wall portions 52 and the bottom portions 51 on the sides farther from the cages. For this reason, the auxiliary tool for feeding that includes only one wing portion 20 desirably has a configuration in which the wing portion 20 extends toward the side wall portion 52 on the side farther from the cage.

In the case of the auxiliary tool for feeding that includes only one wing portion 20, a member for balancing with the wing portion 20 can be extended on the side with no wing portion 20.

Furthermore, although the wing portions 20 have the V shapes as the example in the above-mentioned embodiment, the wing portions 20 may have U shapes. Even the wing portions having the U shapes act as springs having the elastic force to return to their original shapes when compressed such that the apertures of the U shapes are decreased, thereby exerting such a similar action that the end portions of the wing portions are brought into pressure contact with the trough all the time.

What is claimed is:

1. A trough system for feeding, comprising:
    a trough having a side wall portion and provided along a cage row in which a plurality of cages for raising chickens are arranged side by side in a horizontal direction;
    a chain of rings that are arranged in the trough in the horizontal direction, each of the rings having a coupling portion; and
    an auxiliary tool for feeding that is mounted on a part of the chain in the trough,
    the auxiliary tool further comprising:
        a hook portion configured to be hooked on the coupling portion of each one of the rings configuring the chain; and
        at least a wing portion including an end portion having a V shape or a U shape in a top view with respect to the horizontal direction and extending from the hook portion towards the side wall portion of the trough, whereas
    the end portion of the wing portion is brought into pressure contact with the side wall portion of the trough by elastic force to return to an original shape after the wing portion is compressed by decreasing an angle of the V shape or an aperture of the U shape as the auxiliary tool for feeding is mounted on the chain against the side wall portion of the trough.

2. The trough system for feeding according to claim 1, wherein
    the hook portion further includes:
        a flat plate-like bottom surface portion,
        a flat plate-like top surface portion separated from the bottom surface portion in an up-down direction so as to be parallel with the bottom surface portion,
        a side surface portion coupling the bottom surface portion and the top surface portion on the same side, and
        a claw portion extending downward from an end portion of the top surface portion on an opposite side to the side surface portion.

3. The trough system for feeding according to claim 1, wherein the end portion of the wing portion is formed to have a first length in the up-down direction, which is larger than a second length in the up-down direction of a remaining portion that is a part of the wing portion which excludes the end portion.

* * * * *